US010296765B2

(12) United States Patent
Dragone et al.

(10) Patent No.: US 10,296,765 B2
(45) Date of Patent: May 21, 2019

(54) MULTI-LEVEL SECURITY ENFORCEMENT (71) Applicant: International Business Machines Corporation, Armonk, NY (US)

(72) Inventors: Silvio Dragone, Winterthur (CH); Michael C. Osborne, Richterswil (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 14/870,261

(22) Filed: Sep. 30, 2015

(65) Prior Publication Data
US 2017/0091489 A1 Mar. 30, 2017

(51) Int. Cl.
*G06F 21/72* (2013.01)
*G06F 21/60* (2013.01)

(52) U.S. Cl.
CPC ............ *G06F 21/72* (2013.01); *G06F 21/602* (2013.01)

(58) Field of Classification Search
CPC ......... G06F 21/72; G06F 21/602; G06F 21/73
See application file for complete search history.

(56) References Cited

U.S. PATENT DOCUMENTS

| 6,754,819 | B1* | 6/2004 | Wootten | G06F 21/6209 713/150 |
| 7,603,548 | B2* | 10/2009 | Patrick | G06F 21/6218 713/150 |
| 7,673,323 | B1 | 3/2010 | Moriconi | |
| 7,676,623 | B2* | 3/2010 | Fisher | H04L 41/0869 710/16 |
| 8,041,947 | B2* | 10/2011 | O'Brien | G06F 21/572 713/165 |
| 8,160,244 | B2 | 4/2012 | Buer | |
| 8,320,560 | B2 | 11/2012 | Orsini et al. | |
| 2005/0010766 | A1* | 1/2005 | Holden | G06F 21/31 713/166 |
| 2007/0180228 | A1 | 8/2007 | Mattsson | |
| 2007/0253371 | A1* | 11/2007 | Harper | H04W 8/082 370/331 |
| 2008/0232366 | A1* | 9/2008 | He | H04L 12/4633 370/389 |
| 2008/0260147 | A1* | 10/2008 | Shin | H04L 9/0637 380/46 |
| 2011/0315271 | A1* | 12/2011 | Carmona | B64D 37/005 141/98 |

(Continued)

OTHER PUBLICATIONS

Keighren, Gavin, "Restricting Information Flow in Security APIs via Typing," Thesis, University of Edinburgh, 2014, 151 pages.

(Continued)

*Primary Examiner* — Kambiz Zand
*Assistant Examiner* — Tongoc Tran
(74) *Attorney, Agent, or Firm* — L. Jeffrey Kelly (57) ABSTRACT

Embodiments of the present invention may involve providing security to a computing device. The providing security to a computing device may involve performing crypto-operations. A security system may include a central processing unit and a pre-processing unit. The pre-processing unit may be configured for receiving an incoming encapsulated request, parsing header infrastructure information of the encapsulated request, decapsulating the request, and providing the decapsulated request to the central processing unit for further processing.

20 Claims, 6 Drawing Sheets

(56) References Cited

U.S. PATENT DOCUMENTS

| | | | | |
|---|---|---|---|---|
| 2012/0066509 A1* | 3/2012 | Lapp | .................. | G06F 21/606 |
| | | | | 713/189 |
| 2012/0131354 A1* | 5/2012 | French | .................. | G06F 21/602 |
| | | | | 713/189 |
| 2013/0055295 A1 | 2/2013 | Dayka et al. | | |
| 2014/0177842 A1 | 6/2014 | Yellepeddy et al. | | |
| 2014/0247830 A1* | 9/2014 | Kolbe | .................. | H04L 49/354 |
| | | | | 370/392 |
| 2015/0067186 A1* | 3/2015 | Kuhn | .................. | H04L 65/607 |
| | | | | 709/231 |
| 2015/0110003 A1* | 4/2015 | Wilkinson | .............. | H04L 45/54 |
| | | | | 370/329 |

OTHER PUBLICATIONS

Lanz, Daniel J., "High Assurance Cryptographic Interface," Military Communications Conference, 2008, MILCOM 2008, IEEE, pp. 1-5.

Uchenick, Gordon M., et al., "Multiple Independent Levels of Safety and Security: High Assurance Architecture for MSLS/MLS," Military Communications Conference, 2005. MILCOM 2005, IEEE, 5 pages.

* cited by examiner

MULTI-LEVEL SECURITY ENFORCEMENT

BACKGROUND

The present invention relates generally to the field of computing, and more particularly to multi-level security enforcement with a stateless cryptographic coprocessor.

Trusted computing may rely on highly trustworthy information processing systems using Multi-Level Security (MLS) or multiple levels of security. MLS is the application of a computer system to process information with incompatible classifications (i.e., at different security levels), permit access by users with different security clearances and needs-to-know, and prevent users from obtaining access to information for which they lack authorization. There are two contexts for the use of Multi-Level Security. One is to refer to a system that is adequate to protect itself from subversion and that has robust mechanisms to separate information domains, i.e., trustworthiness. Another context is to refer to an application of a computer that will require the computer to be strong enough to protect itself from subversion and that possesses adequate mechanisms to separate information domains, i.e., a system which must be trusted. This distinction is important because systems that need to be trusted are not necessarily trustworthy.

Multi-level security systems, used in high-assurance environments, require privilege separation and reliable tracking of origins and purpose of cryptographic keys and data. While MLS-specific capabilities are available in application-specific cryptographic service providers (CSPs), commodity providers lack the infrastructure of such information tagging. As a prerequisite of enforcing MLS rules, CSPs must associate types with essentially all their inputs, before adding any type-based rule enforcement.

Generic, commodity CSP programming interfaces (APIs), as a rule, do not associate attributes with raw host-visible data, and tend to offer only rudimentary key-usage attributes. Key-transport capabilities are particularly limited, and commodity APIs are mainly incapable of transporting key attributes securely. These deficiencies essentially prohibit a usage of commodity CSPs as building blocks within MLS environments, even if their functional APIs could be easily used by MLS-aware applications.

Thus, there is a need for a commodity CSP or cryptographic module accommodating MLS compliance, while retaining binary-compatible functionality for applications unaware of MLS extensions. A need may also be present for high-assurance key-usage restrictions which may be securely enforced within hardware security systems and managed externally from MLS hosts for a large number of clients requesting cryptographic services.

SUMMARY

Embodiments of the present invention disclose a hardware security module/system for performing crypto-operations comprising a central processing unit and a pre-processing unit. The pre-processing unit may be configured for receiving an incoming encapsulated request, parsing header infrastructure information of the encapsulated request, decapsulating the request, and providing the decapsulated request to the central processing unit for further processing.

Embodiments of the present invention disclose a method for performing crypto-operations using a hardware security module comprising a central processing unit and a pre-processing unit. The pre-processing unit may receive an incoming encapsulated request. The pre-processing unit may parse header infrastructure information of the encapsulated request. The pre-processing unit may decapsulate the request. The pre-processing unit may provide the decapsulated request to the central processing unit for further processing.

Embodiments of the present invention disclose a computer program product for performing crypto-operations. The computer program product may comprise a computer readable storage medium having program instructions embodied therewith. The computer readable storage medium is not a transitory signal per se. The program instructions may be executable by a pre-processing unit. The pre-processing unit may receive an incoming encapsulated request. The pre-processing unit may parse header infrastructure information of the encapsulated request. The pre-processing unit may decapsulate the request. The pre-processing unit may provide the decapsulated request to the central processing unit for further processing.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Embodiments of the present invention may provide multi-level security enforcement with a stateless cryptographic coprocessor. There is a need for a commodity CSP or cryptographic module accommodating MLS compliance, while retaining binary-compatible functionality for applications unaware of MLS extensions. A need may also be present for high-assurance key-usage restrictions which may be securely enforced within hardware security systems and managed externally from MLS hosts for a large number of clients requesting cryptographic services.

Embodiments of the present invention may include one or more of a hardware security system for performing crypto-operations, a method for performing crypto-operations, a computing system, a data processing program, and a computer program product.

In the context of this description, the following conventions, terms and/or expressions may be used:

The term "hardware security system" may denote a unit that may be a component of a computer system. The hardware security system may be connected to other components of the computer system by a bus system. The computer system may comprise a central processing unit (CPU). The hardware security system may serve as a trusted environment to perform cryptographic services for other components of the computer system. The computer system may also comprise software applications or components of an operating system or middleware. The hardware security system may also be denoted as cryptographic service provider (CSP).

The term "crypto-operation" may denote a cryptographic service delivered to a calling function. The crypto-operation may be executed in hardware, in software or in a combination of both. Examples of crypto-operations may be encrypting data or decrypting data, as well as authentication service.

The term "header infrastructure information" may denote information which comprises or consists of serialized header information as well as key objects and attributes containing key information in clear and/or encrypted form as well as authenticity assurances on the message.

The term "central processing unit" (CPU) may denote a central computing element executing program code. Several components of the computer system may comprise its own CPU, in particular independent sub-components like the hardware security module. The CPU may be implemented as a microprocessor—e.g., in the form of a stream coprocessor—or as a more complex component like a central execution complex, as in traditional mainframe computers.

The term "pre-processing unit" may denote a processing element which may perform an initial pre-processing before the CPU may take over processing of data. The pre-processing unit may be implemented in hardware for a fast execution of instructions or a fast parsing of incoming data in a communication system or communication channel. This may improve overall performance and may categorize incoming data for an easier processing by the CPU. In particular, the pre-processing unit may be implemented as a streaming processor or stream coprocessor. The pre-processing unit may be operable to decapsulate incoming data, including requests (see below), from infrastructure header information. Outgoing data from the hardware security module may in turn be encapsulated before transmission.

The term "stream coprocessor" or "stream co-processor" or "stream-CoP" or also "streaming co-processor" may denote a coprocessor to a CPU—e.g., the CPU of the hardware security module—optimized for parsing a data stream, e.g., in communication protocol applications. Typically, stream coprocessors are relatively small scalar processors with a limited set of operations that may be performed on the incoming data. However, because of the limited set of recognized patterns in the data, the stream coprocessor may perform these operations over-proportionally fast.

The term "encapsulation" and "decapsulation" or, encapsulating and decapsulating, respectively, may denote the process of compiling a data packet, consisting of or comprising infrastructure header information and user data, e.g., a request for a crypto-operation, which is secured by its header information, for a secure transmission over potentially insecure communication channels. The "naked" request may be embedded into an encrypted transmission packet. The infrastructure header information is generated such that it permits access by users with different security clearances, and prevent users from obtaining access to information for which they lack authorization. Therefore, the infrastructure header information consists of key objects and attributes containing key information in clear and encrypted, as well as of an authenticity assurances on the request. The entire transmitted data packet including the infrastructure header information may have the format to be described as a regular expression. More details are discussed in the context of FIG. 3.

The term "regular expression" may denote an expression having a known syntax. In theoretical computer science and formal language theory, a regular expression is a sequence of characters that forms a search pattern, mainly for use in patterns matching with strings, or string matching. It is based on the ideas of the mathematician Stephen Kleene. Each character in a regular expression is either understood to be a meta-character with its special meaning, or a regular character with its literal meaning. Together, they can be used to identify textual material of a given pattern, or process a number of instances of it that can vary from a precise equality to a very general similarity of the pattern. The pattern sequence itself may be an expression that is a statement in a language or protocol designed specifically to represent prescribed targets in the most concise and flexible way.

Regular expressions may be used in conjunction with a stream coprocessor because they form a programming model suitable to describe properties of streams. In particular, both regular expressions and stream-centric programming efficiently describe and implement state machines, including pattern recognition of repetitive data.

It may also be recursive that the above-mentioned data may be the request for a crypto-operation of the hardware security module. These data, i.e., the request, may be wrapped or encapsulated within header infrastructure information.

The proposed hardware security module for performing crypto-operations and the related method may offer a couple of advantages:

Basically, the limitations for a secure stateful communication may be overcome with the MLS environments between a cryptographic requesting unit and a cryptographic module (or CSP). As discussed above, a large number of requesting units or clients may lead to constraints in available memory on the cryptographic module. Furthermore, with a stateless CSP interface with full integrity enforcement and a relating cryptographic module, i.e. the hardware security module, for a large number of requesting clients without performance degradation is provided. It comprises an efficient hardware/software partitioning for a fast and flexible deserialization of requests, in particular encapsulated requests. The parser hardware may be built with a minimal set of instructions because regular expressions are used. The incoming infrastructure header information of the encapsulated request stream may be parsed, verified and tagged—i.e., decapsulated—while the actual request is being transferred to the memory of the hardware security module for further processing in software by the CPU of the hardware security module. Hence, the parsing may be performed under strict resource bounds, formats and back-references are recognized and known during pattern loading time. Actually, formats are known a priori, and do not require runtime/dynamic reconfigurations of the interface.

The resulting parser patterns may be evaluated offline to the direct communication flow—and may include any worst-case behavior analysis.

Plaintext recovery may happen in-place, both with or without authentication. The relevant decryption modes do not expand the plaintext, and the ciphertext may be replaced within streams without impact.

Additionally, a decryption may be optional: a signature may be verified if the ciphertext is signed. It may be noted that such an "Encrypt-then-MAC" (message authentication code) is a known good authenticated encryption scheme.

Other advantages may include that a simple status-reporting interface may be exposed to consuming software of the parser output. At a top level, three simple messages may be generated by the parser, i.e., the stream-CoP: success, failure, reason for failure. More detailed results may comprise stream section boundaries and a list of patterns which matched. Consuming software may receive a bit-vector of all applicable patterns and a correspondence of key types (attributes) and patterns may be software-evaluated on the hardware security module by the CPU. Even if the hardware may produce trivially bad combinations, a final choice may be left to the CPU and software of the hardware security module to take a final decision.

Optionally, details of any partial match of elements of incoming data, even if nothing failed, may be delivered to the software of the hardware security module. As a useful side-effect, the parser may mirror the state where a parsing stopped, which may be useful in case a stream resynchronization may be required. The software of the hardware security module may easily evaluate parsed/tagged stream. And, all policy decisions may be left to software, whereas the stream coprocessor may calculate (one level of) cryptographically expensive functions, i.e., verify MAC/signature on streams (or portions thereof) or decrypt data effective on architectures where the software dominates and limits the speed of the system.

According to one embodiment, the pre-processing unit is adapted to provide the parsing results and the decapsulated request to the central processing unit for further processing.

According to one embodiment of the hardware security module, the pre-processing unit may be a stream coprocessor. This may be advantageous because stream processors have the ability to execute fast pattern matching. Especially if the incoming data, i.e., the encapsulated request, are parsed as a regular expression within a defined grammar, the streaming processor may have the opportunity to decode wrapping elements, in particular the header infrastructure information, of the core request or request in a very limited amount of time. If, in particular, the set of operations performed by the stream processor may be limited due to the form of the encapsulated requests as regular expressions, the stream coprocessor may detect characteristic patterns of the encapsulated request. Only little delay may be experienced by the requestor.

According to one advanced embodiment of the hardware security module, the pre-processing unit comprises a controller configured for controlling a data movement from a direct memory access (DMA) area in an incoming data path to a buffer. The buffer may be a component of the hardware security module and may be operated as a scratch pad for incoming data. At the same time, the related DMA channel receiving the incoming data packets may trigger the stream coprocessor for a new arriving data packet.

According to an advantageous embodiment of the hardware security module, the pre-processing unit may further be adapted to match the encapsulated request against one or more regular expressions. This way, the pre-processing unit, e.g., the stream coprocessor, may be well prepared to segment and classify encapsulated requests into individual components, identifying their type according to predefined regular expression(s) metadata. The result of identification may include the regular expression(s) which matched the encapsulated request, and the size/location of any recognized regular expression terms. Thus, regular expressions accelerate and facilitate pattern recognition of an incoming data stream to the hardware security module using the defined regular expressions with a defined structure.

According to a further embodiment of the hardware security module, the incoming data-path may be implemented as a Peripheral Component Interconnect Express (PCIe) adapter. This may allow for standard components to be used for protocol handling and electrical connections. Existing hardware security systems may be exchanged easily with the inventive hardware security system for enhanced security in complex environments with many units requesting crypto-services from the hardware security system.

According to a further enhanced embodiment of the hardware security system, a memory controller, being configured for controlling a data movement from the direct memory access area to a main memory of the hardware security system, is blocked until the pre-processing unit may finish a processing of an incoming data packet to the hardware security system. This may ensure that the pre-processing by the pre-processing unit may be executed first enabling a pre-decoding of the incoming wrapped or encapsulated request. The requested crypto-operation may afterwards be executed by the CPU of the hardware security system in software.

According to another enhanced embodiment of the hardware security system, the memory controller may be adapted for controlling a data movement from the direct memory access area to a main memory of the hardware security system, during the decapsulating the encapsulated request. Thus for performance reasons, the parsing of the incoming encapsulated request may be executed in parallel to the data movement into the memory of the hardware security system. Thus, no time is lost due to the operation of the stream coprocessor.

According to one more enhanced embodiment of the hardware security system, the pre-processing unit, e.g. the stream coprocessor, may be adapted to handle at least one security primitive out of the group comprising RSA, Secure Hash Algorithm (SHA), keyed-Hash Message Authentication Code (HMAC), Advance Encryption Standard (AES), Elliptic Curve Cryptography (ECC). Additionally, the pre-processing unit may be adapted to handle also higher level protocols based on these primitives. Hence, the hardware security system may be able to operate in different environments or in environments with mixed security protocol requirements in form of symmetric or asymmetric encryption/decryption requirements.

According to one embodiment of the hardware security system, the result, which the pre-processing unit may provide to the central processing unit, may comprise at least one out of the group comprising a success signal, a failure signal, and a reason for the failure signal. Thus, the pre-processing unit may handle communication protocol requirements and may inform the CPU of the hardware security system about a successful or malfunction of a secure protocol chosen by a requesting host.

According to one embodiment of the method the parsing results and the decapsulated request are provided to the central processing unit for further processing.

According to one embodiment of the method for performing crypto-operations, the encapsulated request may be parsed as specified by one or more regular expressions. This may be achieved by the operation of the pre-processing unit, i.e., the stream-processor, which may be enabled to recognize a regularly structured expression of the protocol wrapping or encapsulating the request. Due to its structure, the pre-processing unit is efficiently prepared to recognize the request infrastructure data easily and fast.

One enhanced embodiment of the method for performing crypto-operations may additionally comprise a series of steps. Initially, a data packet from a data source, e.g., a source domain, may be encrypted. This may result in transport encrypted data. Next, a signature may be generated—in particular using Message Authentication Code (MAC), a sign key, respectively—for transport encrypted data resulting in an encrypted and authenticated data envelope comprising the data packet, e.g., the request. Then, the encrypted and authenticated data envelope may be transferred—in particular to the target domain, i.e., the hardware security system. Here, the signature of the transferred and authenticated data envelope may be verified, in particular by the stream coprocessor. Finally, the transport encrypted data may be decrypted resulting in the data packet, i.e., the original request, from the source domain. This request may then be further processed by the CPU of the hardware security system.

Thus, no information about the requesting source domains may be need to be stored on the hardware security system. The secure message transfer may be handled completely in a serialized form by the protocol using the stream coprocessor.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited. Embodiments of the present invention will now be described in detail with reference to FIGS. 1-10.

Figure 1:
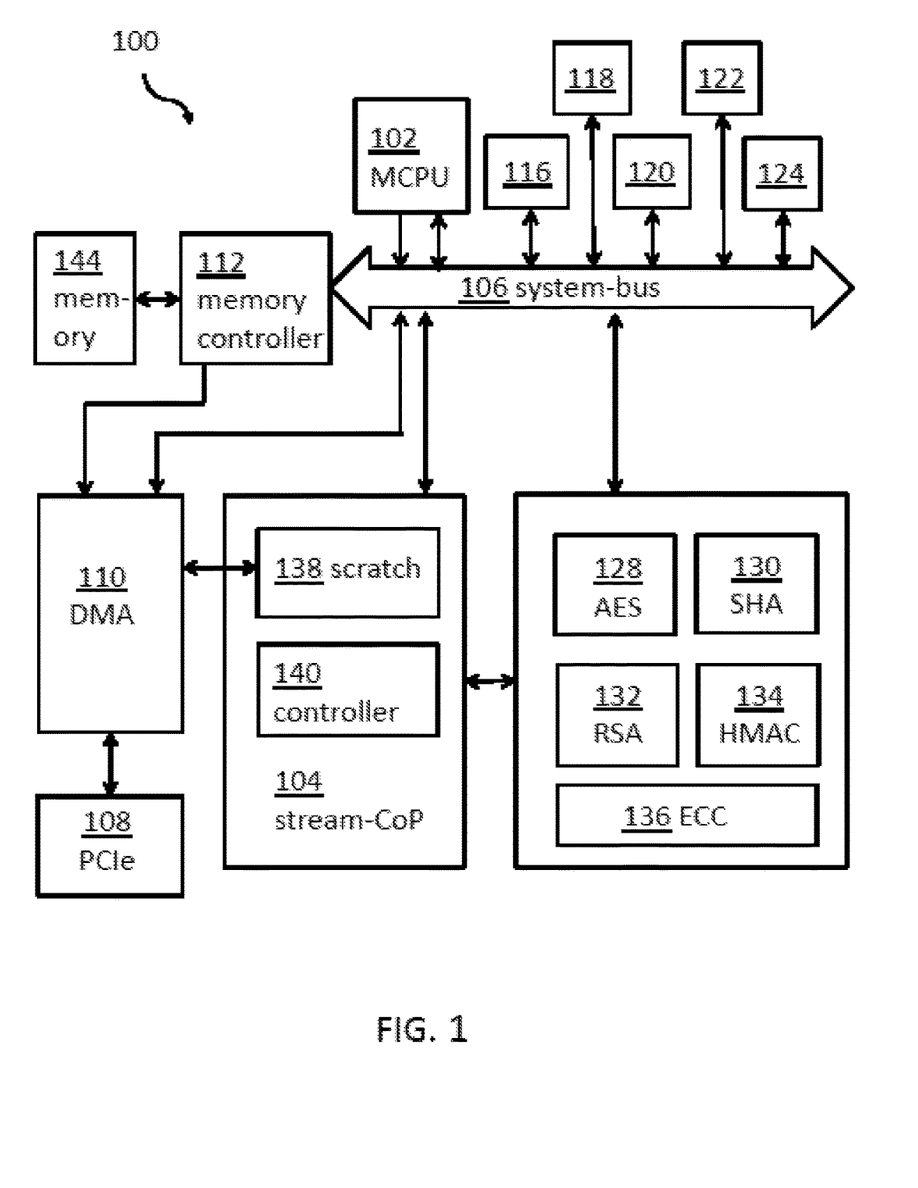
FIG. 1 shows a block diagram of a hardware security system for performing crypto-operations, in accordance with an embodiment of the present invention.

FIG. 1 shows a block diagram of a hardware security system 100 for providing cryptographic services. Like traditional hardware security systems, the hardware security system 100 comprises a CPU 102 connected to an onboard system 106. Other traditional components of the hardware security system 100 comprise: a serial communication interface 116, e.g. an RS232 interface, a battery back RAM 118, (random access memory), a real-time clock generator 120, and a flash memory 124. Moreover, a tamper sensor 122 and related control electronic circuits may be attached to the system bus 106. The tamper sensor 122 may detect whether physical manipulation has been performed to the hardware security system 100.

A request for a crypto-operation may be received via a PCIe (Peripheral Component Interconnect Express) interface 108 which may deliver its received data to a DMA (direct memory access) area, 110. The DMA area 110 may be controlled by the MCPU 102. A memory controller 112 may be operable to transfer the received data to a memory MEM, 144. From here, the received data, e.g., the request for a crypto-operation may be executed using the MCPU 102.

Also attached to the system bus 106 may be a module with a library of known encryption primitives like Advance Encryption Standard (AES), 128, Secure Hash Algorithm (SHA) 130, RSA 132, Hash Message Authentication Code (HMAC) 134, Elliptic Curve Cryptography (ECC) 136 or others, as well as higher level protocols from these primitives.

A core component of the hardware security system 100 is the stream coprocessor stream-CoP 104. It may comprise a scratch area 138, also denotable as buffer for incoming data and a controller. Additionally and not shown, a scratch mover may be implemented. It may be used for transferring data from the DMA area 110 to the scratch area 138. Also not shown may be a bus mover, used for moving data from the scratch pad 138 to the system bus 106. A dedicated arithmetic logical unit (ALU—also not shown) may operate on the data in the scratch area 138, i.e., operate on the wrapping information of the incoming request. Thus, incoming encapsulated data may directly be accessed and operated on by the stream-CoP 104. Hence, the hardware security system 100 using its stream-CoP 104 for dismantling a securely transferred request may decode the wrapping information of a request in hardware in a fast way without requiring memory resource as references for requesting domains and without involving the MCPU 102. The MCPU 102 may be informed by the stream-CoP 104 that a transport secured request may have arrived and that it may be ready for processing by the MCPU 104 in software.

The mentioned hardware decoding may be possible because of the form of the encapsulated request as a regular expression.

Figure 2:
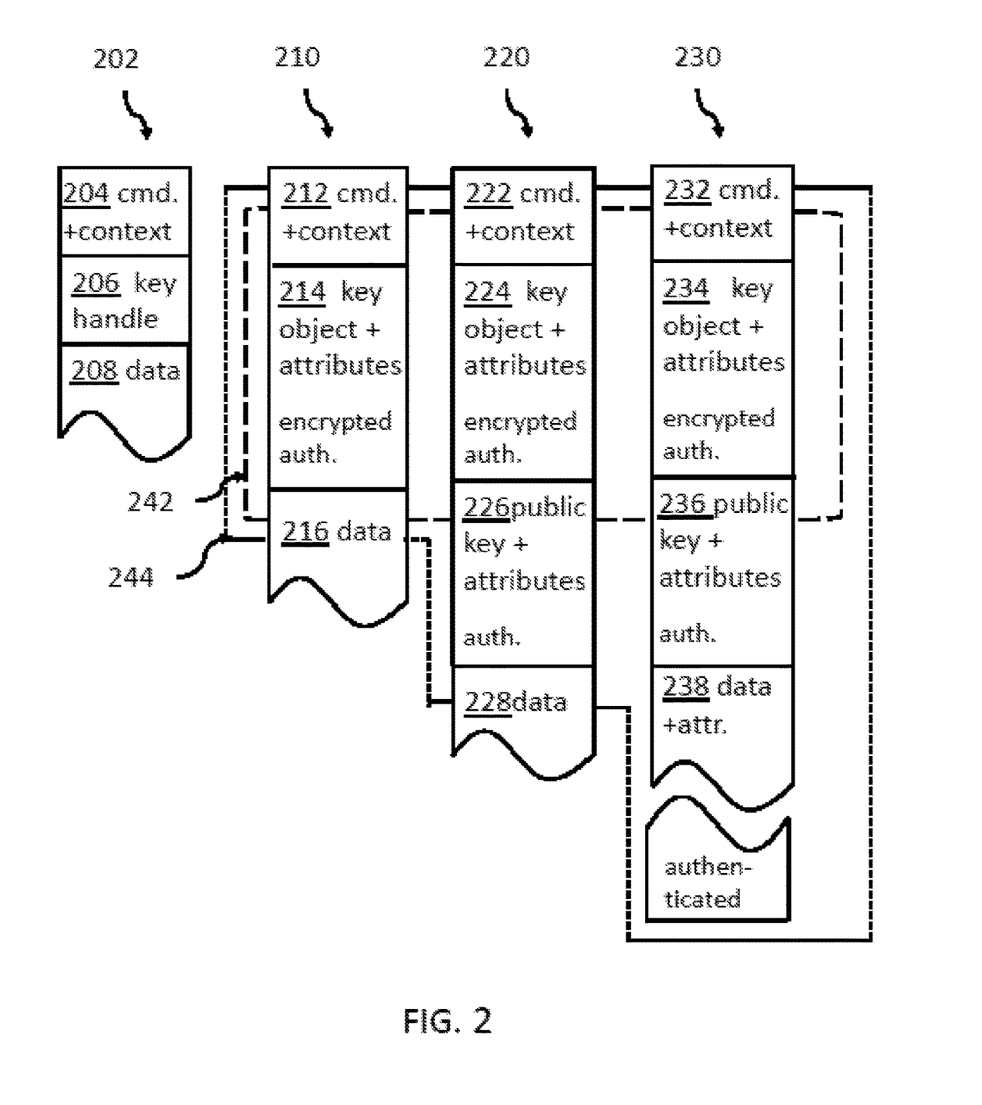
FIG. 2 shows a block diagram of different protocol stacks for transmitting requests from a source domain to a target domain, in accordance with an embodiment of the present invention.

FIG. 2 shows a block diagram of different protocol stacks for transmitting requests from a source domain to a target domain. The protocol stack 202 may describe a commodity stateful cryptographic service provider (CSP) protocol stack. It may include header information 204 comprising a command and header information 204. At a next level, a key handle 206 as well as data 208 are shown. However, such a solution may not guarantee confidentiality.

Instead, confidentiality may be guaranteed by a stateless CSP interface with key-integrity enforcement, as shown in the protocol stacks 210, 220, and 230. The protocol stack components that may guarantee confidentiality are marked with a dashed line 242.

The protocol stacks 210, 220, and 230 may comprise the command and context component 212, 222, 232, respectively, and the key objects including attributes which are encrypted and authenticated 214, 224, and 234, respectively. Protocol stack 210 may comprise only sensitive objects. In contrast to protocol stack 210, the protocol stack 220 may include non-sensitive authenticated keys/states. This may be achieved by an additional protocol layer which comprises a public key and attributes 226 which may be authenticated. Additionally, the protocol stack 220 comprises the data 228, i.e., the request.

In protocol stack 230, a stateless CSP interface with full integrity enforcement is shown. The protocol stack 230 may include the command and context component 232, the key objects including attributes which are encrypted and authenticated 234, a public key and attributes 236 and a data and attributes 238. In addition, the data and attributes 238 may be authenticated. As dashed line 244 shows, the level of integrity increases from protocol stack 210 via stack 220 to stack 230.

Protocol stack 230 with full integrity enforcement may be handled by the hardware security system 100 of FIG. 1 in a completely serialized way of the protocol. It may be noted that the data and attributes 238 may comprise the request for a cryptographic service of the MCPU 102.

Figure 3:
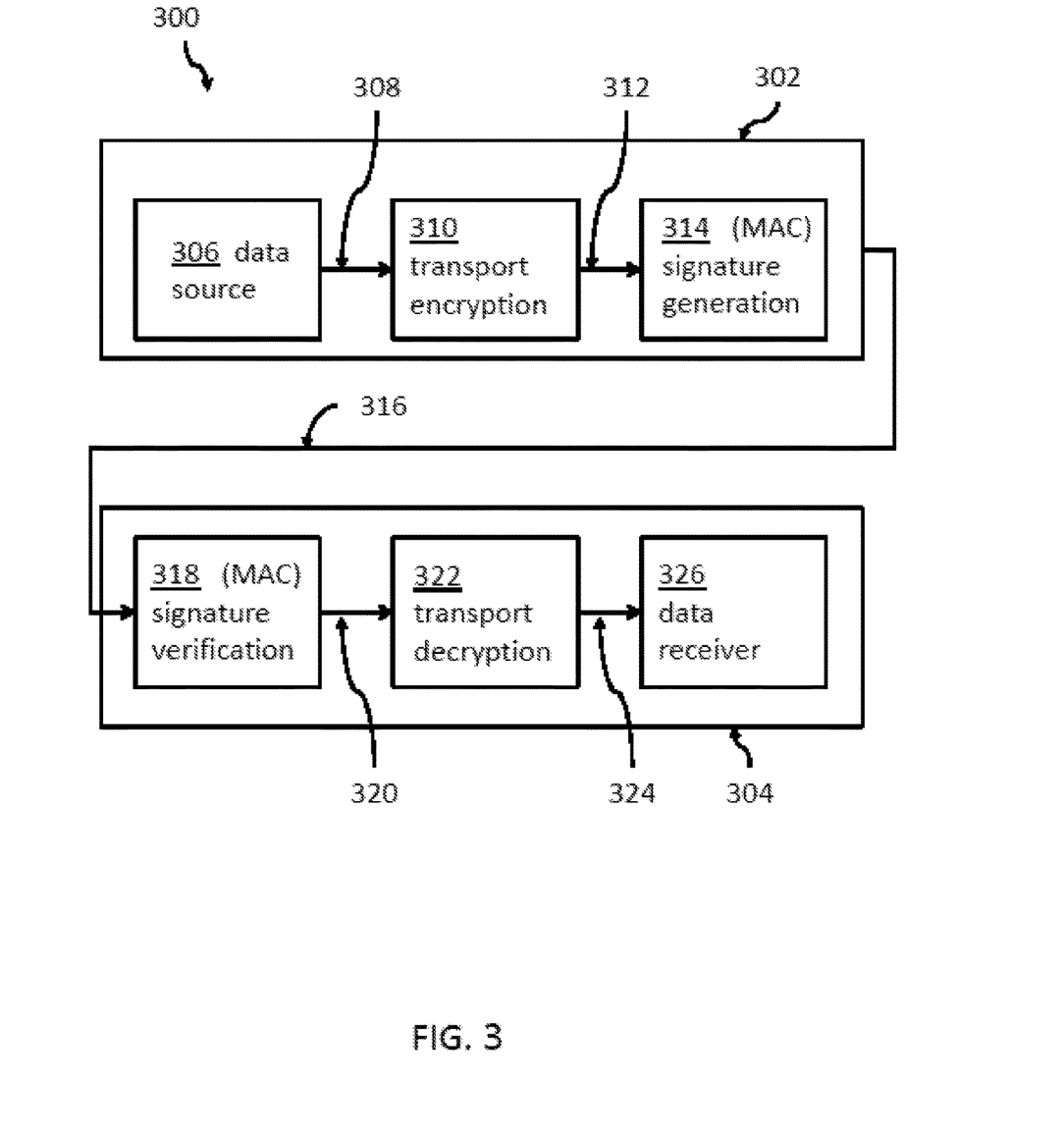
FIG. 3 shows a flowchart of multi-level security enforcement method, in accordance with an embodiment of the present invention.

FIG. 3 is a flowchart of a multi-level security enforcement method 300 (hereinafter "multi-level method").

Assuming that no information about the requesting source domains is stored on the hardware security system, one would build equivalent structures from separate encryption and signing (MAC=message authentication code) keys. A desirable goal may be to force an Encrypt-then-MAC ordering—i.e., encrypt data, and then sign the ciphertext—which may offer the best security properties of all possible orderings. This restriction on operation order should be enforced without changing any of the semantics of Encrypt or Sign calls. To force Encrypt-then-MAC and reject any other combination, the here described system may add several data types, and corresponding key-usage restrictions. As data pass through the system, the state machine updates may be reflected in the data-type attribute evolving.

The multi-level method 300 shows a source domain 302 and a target CSP 304 or vice-versa, a source CSP and a target domain.

The source data 306, e.g., a request for a crypto service, may be flagged as requiring Encrypt-then-MAC encapsulation (the original data source 306 may generate data, i.e., the request, with this type, defined as type 1 data). Such data pass as data 308—defined as type D1 data—to the transport encryption 310. The encrypted data, i.e., ciphertext, pass—defined as type 2 data—to the next stage, the signature generation 314. On the communication path 316 encrypted and "MACed" data travel from the source domain 302 to the target CSP 304. Here, the data are defined as type 3 data.

As an additional advantage of the proposed solution, the communication path 316 may be safely released to untrusted intermediate networks between the domain and CSP.

After signature verification 318 on the target CSP side 304, encrypted data, tagged as verified by a receiving MAC key (still ciphertext), are passed—defined as D4 data—to the next stage: the transport decryption stage 322. After that phase, clear-text retrieved from an approved Encrypt-then-MAC enclosure is available—defined as type 5 data—for the data receiver 326. The signature verification 318 and the transport decryption stage 322 may also be denoted as part of the decapsulation process.

In this example, encryption keys would operate only on data of type 1, MAC-signature keys would sign data of type D2, MAC-verify keys would accept type D3 data and mark accepted envelopes as D4 type data which then could be passed to decryption keys. This sequence of type enforcement would proceed through Encrypt-then-MAC operations strictly in predefined order, requiring only minuscule additions to traditional key-usage attributes. For calls out of sequence, data or keys would be rejected as invalid, i.e., unexpected type. A signal may be passed from the stream-CoP 104 to the CPU 102 of the hardware security system 100.

Since data would be generated marked as D1 type data, and would need to be retrieved from a D4 type data form by the final receiver as D5 type data, the process obviously may not bypass Encrypt-then-MAC formatting. The participating keys' rules would simply enumerate the accepted input formats, such as a MAC-verify key requiring D3 type data input, and appending a type D4 data tag to output which has been verified.

In practice, as shown in FIG. 2, source domain 302 and target CSP 304 could be hosted on different systems. Assuming integrity keys between the sending and receiving commands are available to both domain and CSP 302, 304, the security of the Encrypt-then-MAC construct may be preserved as messages pass through a memory-typed state machine.

Note that the specific details of synthesizing data-flow graphs to data types and key-usage restrictions need not be exposed to applications directly. In practice, cryptographic protocol compositions may be easily compiled into data-type-based state machines similar to the above authenticated encryption example.

Figure 4:
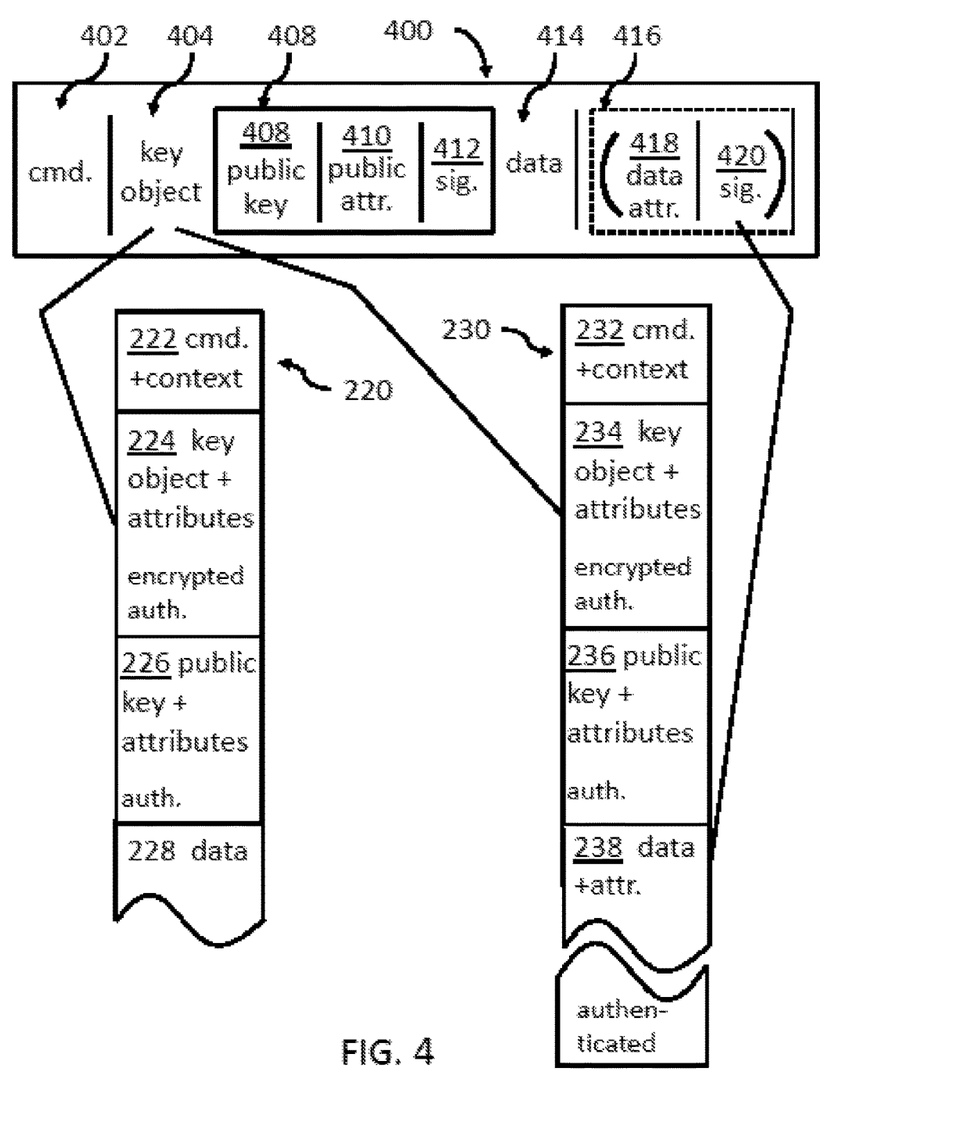
FIG. 4 shows a regular expression of a transport encrypted request, in accordance with an embodiment of the present invention.

In order to enable the stream-CoP 104 of FIG. 1 for performing fast protocol operations in hardware of type D3 data, 316, the stream-CoP 104 may analyze regular expressions in the following form of FIG. 4 which shows an exemplary embodiment of the regular expression 400 of the transport encrypted request.

FIG. 4 shows again the protocol stacks 220 and 230 of FIG. 2.

A command 402 follows a key object 404 comprising a public key 408, public attributes 410 and a signature 412. Next, data 414 follow comprising data and attributes 418 as well as a signature 420. Thus, corresponding to the data and attributes 238 of protocol stack 230, the data and attributes 418 are authenticated.

Using such regular expressions 400 as type D3 data (compare FIG. 3), the stream-CoP 104 of the hardware security system 100 may process enumerated, valid request constructs—including the request and wrapping header information, i.e., infrastrucure header information—as regular expressions 400, or define substantially similar parsing state machines. The parsing of the stream-CoP 104 may be performed during any incoming data transfers, before the receiving software executing on the MCPU 102 may be notified, e.g., when a DMA controller—operating on data in the DMA area 110—as a channel device moves data.

With a superficial parsing pass, requests which clearly appear to be malformed terminate hardware processing of the stream-CoP 104, and a general parsing error may be reported to the MCPU 102. Incoming data may still be delivered to the software-visible memory 144.

These malformed requests would need to be parsed entirely in software by the MCPU 102, or potentially discarded depending on the depth of hardware support, and whether all possible request types may be understood by the hardware.

All accepted incoming patterns may be matched against known pattern requests. A bit vector marking all patterns which were matched may be returned to the MCPU 102. If no match may be found, control may pass to software running on the MCPU 102 with a special indication, and a hit bit-vector remains empty. It may be assumed that the software may react to such non-trivially malformed requests, and further hardware assistance may not be necessary.

The software may recover any context-dependent secondary information, such as key attributes from within encrypted objects, which may be inside opaque objects that may not be parsed by hardware, i.e. the stream-CoP. Generally, any attribute embedded within encrypted objects, or those not trivially parse-able, would require context-specific processing in software.

Since it may be assumed that the hardware parser, i.e., the stream-CoP 104 may generally not descend into encrypted regions, the full context of the request may only be evaluated when key internals are also known. Therefore, the stream-CoP 104 will indicate which patterns, i.e., regular expressions, match the request, and react in accordance with what keys require. In the case of FIG. 3, the request would be rejected if key attributes would mandate typed data—i.e., the optional data attributes and signatures must also be present—before any additional checking, such as a data-signature verification, is performed.

Note that the proposed solution does not rely entirely on hardware for parsing incoming data, even if most fixed configurations would allow it. The proposed system would benefit the most from a hardware parser, i.e., the stream-CoP 104 for parsing, recognizing all supported incoming types, reporting definite errors or the set of patterns which accept the input request. Since multi-level security (MLS) types are effectively "sub-classing" data fields, multiple patterns are expected to match most requests, as each MLS-annotated field may be interpreted as raw data. Therefore, the most beneficial implementation may indicate the set of patterns which matched, and the controlling software would then match that against what is expected based on higher-level context—such as attributes of keys, which themselves may not be hardware-visible.

If the set of possible request structures may change due to configuration settings, the hardware—in particular the stream-CoP 104 of the hardware security system 100—may accommodate dynamic changes.

Figure 5:
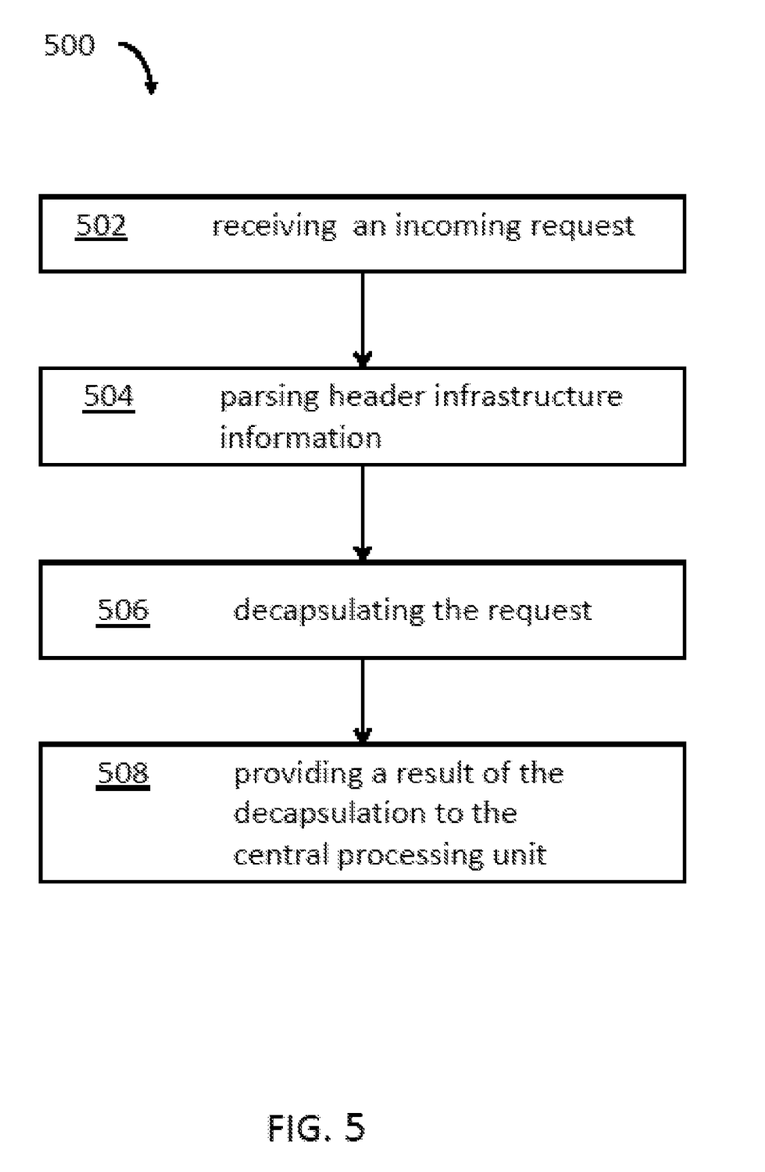
FIG. 5 shows a flow chart of a method for performing crypto-operations, in accordance with an embodiment of the present invention.

FIG. 5 shows an embodiment of a block diagram of the method 500 for performing crypto-operations by using a hardware security system 100 which may comprise a central processing unit 102 and a pre-processing unit 104, e.g., the stream-CoP 104. The pre-processing unit 104, e.g. the stream coprocessor, receives 502, an incoming encapsulated request—in particular wrapped in header infrastructure information—and parses, 504, relating header infrastructure information of the request. The pre-processing unit 104 also decapsulates, 506, the request—in particular from the encapsulated request—by performing at least one operation out of a set of predefined operations, and provides 508, a result of the decapsulation to the central processing unit 102 for further processing.

Figure 6:
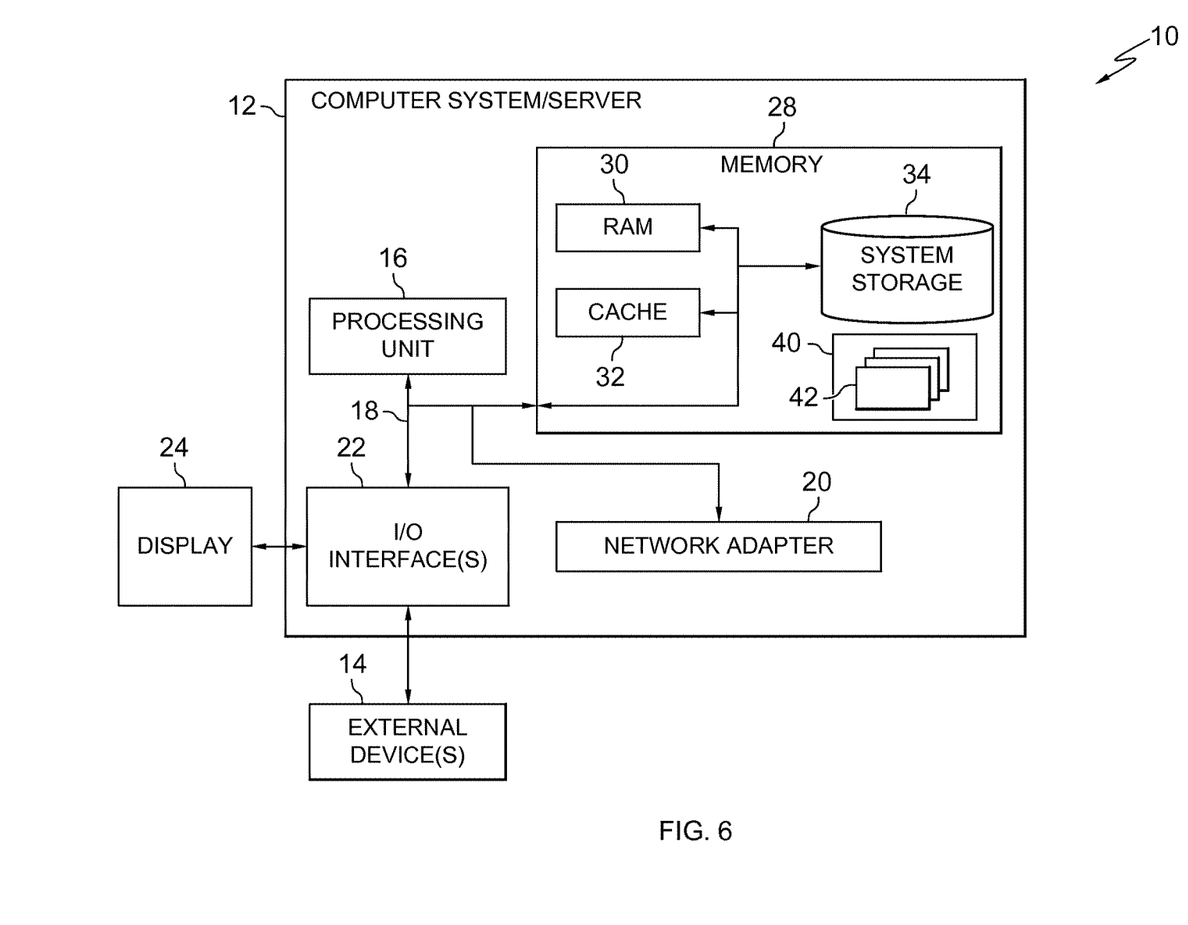
FIG. 6 shows a block diagram of components of a computing node executing the hardware security program, in accordance with an embodiment of the present invention.

Referring now to FIG. 6, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A hardware security module for performing crypto-operations comprising a central processing unit and a pre-processing unit, wherein the pre-processing unit is configured for:
   receiving an incoming encapsulated request;
   parsing header infrastructure information of the encapsulated request, wherein the pre-processing unit has a limited set of instructions, wherein the limited set of instructions are used to read one or more regular expressions, wherein the pre-processing unit classifies the incoming encapsulated request into individual components and identifies the individual components type according to predefined regular expression metadata;
   decapsulating the request, wherein the decapsulation process includes a signature verification and a transport decryption phase; and
   providing the parsed header infrastructure information and the decapsulated request to the central processing unit for further processing.

2. The hardware security module of claim 1, wherein the pre-processing unit is a stream coprocessor.

3. The hardware security module of claim 1, wherein the pre-processing unit comprises a controller configured to control a data movement from a direct memory access area in an incoming data path to a buffer.

4. The hardware security module of claim 1, wherein the pre-processing unit is further adapted to match the encapsulated request against one or more regular expressions.

5. The hardware security module of claim 1, wherein an incoming data-path is implemented as a Peripheral Component Interconnect Express (PCIe) adapter.

6. The hardware security module of claim 1, wherein a memory controller, being adapted for controlling a data movement from the direct memory access area to a main memory of the hardware security module, is blocked until the pre-processing unit finishes a processing of an incoming data packet to the hardware security module.

7. The hardware security module of claim 1, wherein a memory controller is adapted for controlling a data movement from the direct memory access area to a main memory of the hardware security module, during the decapsulating of the request.

8. The hardware security module of claim 1, wherein the pre-processing unit is adapted to handle at least one security primitive out of the group comprising RSA, Secure Hash Algorithm (SHA), keyed-Hash Message Authentication Code (HMAC), Advance Encryption standard (AES), Elliptic Curve Cryptography (ECC), or higher level protocols based on these primitives.

9. The hardware security module of claim 1, wherein the result to the central processing unit comprises at least one out of the group comprising a success signal, a failure signal, and a reason for failure signal.

10. A method for performing crypto-operations using a hardware security module comprising a central processing unit and a pre-processing unit, wherein the pre-processing unit performs:
    receiving, by the pre-processing unit, an incoming encapsulated request;
    parsing header infrastructure information of the encapsulated request, wherein the pre-processing unit has a limited set of instructions, wherein the limited set of instructions are used to read one or more regular expressions, wherein the pre-processing unit classifies the incoming encapsulated request into individual components and identifies the individual components type according to predefined regular expression metadata;
    decapsulating, by the pre-processing unit, the request, wherein the decapsulation process includes a signature verification and a transport decryption phase; and
    providing, by the pre-processing unit, the parsed header infrastructure information and the decapsulated request to the central processing unit for further processing.

11. The method for performing crypto-operations of claim 10, wherein the encapsulated request is parsed as specified by one or more regular expressions.

12. The method for performing crypto-operations of claim 10, wherein the method further comprises:
    encrypting a data packet from a data source resulting in transport encrypted data;
    generating a signature for the transport encrypted data resulting in an encrypted and authenticated data envelope comprising the data packet;
    transferring the encrypted and authenticated data envelope;
    verifying the signature of the transferred and authenticated data envelope; and decrypting the transport encrypted data resulting in the data packet from the source.

13. A data processing program for performing the method for performing crypto-operations according to claim 10, the data processing program comprising software code portions for performing the method, when said data processing program is run on a computer system.

14. A computer program product for performing crypto-operations, the computer program product comprising a computer readable storage medium having program instructions embodied therewith, wherein the computer readable storage medium is not a transitory signal per se, the program instructions executable by a pre-processing unit to cause the pre-processing unit to perform a method comprising:
  receiving, by the pre-processing unit, an incoming encapsulated request;
  parsing, by the pre-processing unit, header infrastructure information of the encapsulated request, wherein the pre-processing unit has a limited set of instructions, wherein the limited set of instructions are used to read one or more regular expressions, wherein the pre-processing unit classifies the incoming encapsulated request into individual components and identifies the individual components type according to predefined regular expression metadata;
  decapsulating, by the pre-processing unit, the request, wherein the decapsulation process includes a signature verification and a transport decryption phase; and
  providing, by the pre-processing unit, the parsed header infrastructure information and the decapsulated request to a central processing unit for further processing.

15. The computer program product of claim 14, wherein the pre-processing unit is a stream coprocessor.

16. The computer program product of claim 14, wherein the pre-processing unit comprises a controller configured to control a data movement from a direct memory access area in an incoming data path to a buffer.

17. The computer program product of claim 14, wherein the pre-processing unit is further adapted to match the encapsulated request against one or more regular expressions.

18. The computer program product of claim 14, wherein an incoming data-path is implemented as a Peripheral Component Interconnect Express (PCIe) adapter.

19. The computer program product of claim 14, wherein a memory controller, being adapted for controlling a data movement from the direct memory access area to a main memory of the hardware security module, is blocked until the pre-processing unit finishes a processing of an incoming data packet to the hardware security module.

20. The computer program product of claim 14, wherein a memory controller is adapted for controlling a data movement from the direct memory access area to a main memory of the hardware security module, during the decapsulating of the request.

* * * * *